United States Patent
Mazanik

(10) Patent No.: US 8,306,364 B2
(45) Date of Patent: Nov. 6, 2012

(54) METHOD FOR COLOR INTERPOLATION

(75) Inventor: Michal Mazanik, Wroclaw (PL)

(73) Assignee: Vidiom SA, Pregny-Chambesy (CH)

( * ) Notice: Subject to any disclaimer, the term of this patent is extended or adjusted under 35 U.S.C. 154(b) by 1060 days.

(21) Appl. No.: 12/249,929

(22) Filed: Oct. 12, 2008

(65) Prior Publication Data

US 2009/0097742 A1 Apr. 16, 2009

(30) Foreign Application Priority Data

Oct. 12, 2007 (EP) .................................... 07019979

(51) Int. Cl.
*G06K 9/00* (2006.01)
*G06K 9/32* (2006.01)
(52) U.S. Cl. ....................... 382/300; 382/162
(58) Field of Classification Search ........... 382/162.167, 382/300
See application file for complete search history.

(56) References Cited

U.S. PATENT DOCUMENTS

| | | | | |
|---|---|---|---|---|
| 6,002,408 A * | 12/1999 | Long | .............................. | 345/592 |
| 7,236,191 B2 * | 6/2007 | Kalevo et al. | ............... | 348/222.1 |
| 7,412,092 B2 * | 8/2008 | Nomura et al. | ................ | 382/162 |
| 7,466,451 B2 * | 12/2008 | Kobayashi | ..................... | 358/1.9 |
| 7,957,588 B2 * | 6/2011 | Ishiga | ............................ | 382/167 |
| 2008/0240559 A1 * | 10/2008 | Malvar | ........................... | 382/167 |

OTHER PUBLICATIONS

Eric Meyer "Color Blender" Jul., 2007 http://web.archive.org/web/20070711133315/http://meyerweb.com/eric/tools/color-blend/.*

* cited by examiner

*Primary Examiner* — Bhavesh Mehta
*Assistant Examiner* — Utpal Shah
(74) *Attorney, Agent, or Firm* — Matthias Scholl, PC; Matthias Scholl

(57) ABSTRACT

In a method for color interpolation between two colors, each interpolated color between a first color having at least two color components and a second color having at least two color components, is defined by copying at least one color component from a corresponding color component of a neighboring color and calculating at least one other color component.

6 Claims, 3 Drawing Sheets

METHOD FOR COLOR INTERPOLATION

CROSS-REFERENCE TO RELATED APPLICATIONS

This application claims priority to the European Patent Application No. EP07019979 filed on Oct. 12, 2007, the contents of which are incorporated herein by reference.

BACKGROUND OF THE INVENTION

1. Field of the Invention

The present invention relates to a method for color interpolation, and more particularly, to graphics processing systems performing interpolation of color between two pixels each having an assigned color value.

2. Brief Description of the Background of the Invention Including Prior Art

Interpolation of pixels attributes are well known in computer graphics. They are mathematical calculations used to determine what value of an attribute are to be assigned to a pixel, based upon the values of corresponding attributes of its neighbours. Such values may for example be color of a pixel. Color interpolations are common in the art and are executed frequently. Therefore each gain in performance of an interpolation has a significant impact on overall performance of the graphics system. Such graphics system may be a two or three dimensional graphics generating system, a printing system any other system using interpolation techniques. Recently such systems also include 2.5D graphics systems where a computer system uses 2D computer graphics to visually simulate 3D computer graphics.

Hence, there exists a problem of how to decrease performance requirements without compromising users experience while looking at video or graphical data output by the aforementioned devices.

SUMMARY OF THE INVENTION

Purposes of the Invention

It is an object of the present invention to provide a graphics data processing method for color interpolation that has low computing speed requirements and that will not lead to a noticeable picture quality decrease.

This and other objects of the technical concept presented herein are accomplished in accordance with the principles of the presented technical concept by providing an improved color interpolation method.

BRIEF DESCRIPTION OF THE INVENTION

In a method for color interpolation between two colors, each interpolated color between a first color having at least two color components and a second color having at least two color components, is defined by copying at least one color component from a corresponding color component of a neighboring color, calculating at least one other color component and combining said at least one other color component calculated in step of calculating with said at least one color component copied in step of copying to create an interpolated color.

The color components can be Red, Green and Blue.

Preferably, the step of calculating includes modifying a color component by a color slope multiplied by a color slope multiplier.

Preferably, at least two groups of color components are created.

A first color components group can comprise Red and Blue color components whereas a second color components group can comprise a Green color component.

The neighboring color can be a previous color or a preceding color.

The idea of the invention is also a computer program comprising program code means for performing all the steps of the above-described method when said program is run on a computer as well as a computer readable medium having computer-executable instructions performing all the steps of the above-described computer-implemented method.

BRIEF DESCRIPTION OF THE DRAWINGS

The invention will now be described by way of example and with reference to the accompanying drawings in which.

DESCRIPTION OF INVENTION AND PREFERRED EMBODIMENT

Figure 1:
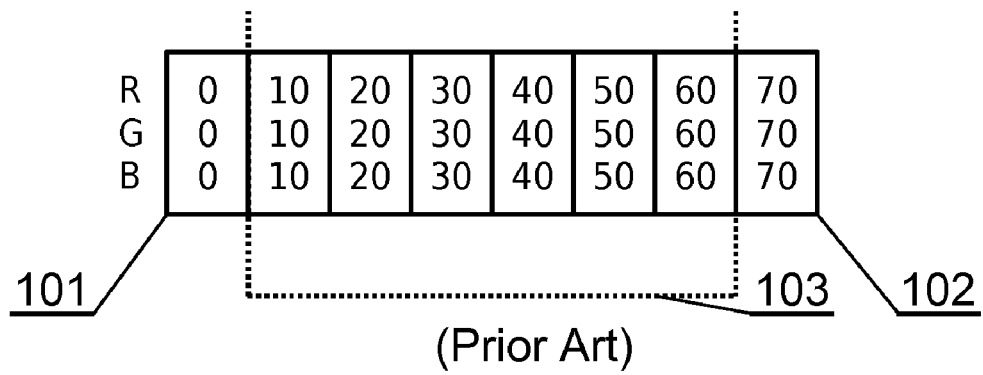
FIG. 1 shows an example of typical color interpolation.

The embodiments presented in the drawings are intended only for illustrative purpose and do not limit the scope of the present invention, as defined by Many computer systems, that generate graphics, allow an area to fill with a single and/or multiple colors, color points or color pixels. In the case of multiple colors, color points or color pixels computer programs can automatically blend between the color points, color pixels or colors, specified as starting values. This blending between two or more color points, color pixels or colors produces an effect commonly known as a color gradient.

To fill a region with a linear gradient, a line segment is specified (e.g., on the drawing canvas) and colors are associated with points along the line segment. For example, one endpoint of the line segment can be mapped to blue, the other endpoint can be mapped to yellow. The color at any other point on the line segment is determined by interpolating (e.g., using linear or other interpolation) between the specified colors. The linear gradient is the most basic gradient of all and is therefore most frequently used.

The colors associated with the points may be defined in various ways. A color in a graphics application is typically represented by one or more color components. For example, in an RGB color space, all colors are represented by a combination of the color components Red, Green and Blue, and in a CMYK color space, the corresponding colors are instead represented by a combination of the color components Cyan, Magenta, Yellow and a Key color (Black). The amount of each color component is determined by a color component value. Conventionally, a color change between two selected colors in a gradient is generated by interpolating each and every of the color components between the color component values in the first color and the color component values in the second color respectively.

One of the cases where color interpolation is applicable, on a large scale, is shading, for example according to the Gouraud algorithm. In Gouraud shading a color is assigned to each vertex or a triangle and used to compute the rate of change of each color component (for example R, G, B) over the whole interior of the triangle.

The problem of Gouraud shading reduces at some point to a linear interpolation of RGB color component values over the horizontal span of N pixels. The pixel on the left side of span has for example color component R0, G0, and B0 values assigned, while the pixel on the right side has R1, G1 and B1 color component values.

FIG. 1 shows an example of typical color interpolation as known from the prior art. In this example RGB colors have been used. The first RGB color components 101 all equal 0. The second RGB color components 102 all equal 70. Nevertheless it is to be understood that all values may be used and components values need not be equal. The colors to be interpolated are in the range 103. Color slope in this case equals (70−0)/(7−0) wherein 70 and 0 are color components values and 7 and 0 are for example X coordinates of first and second given pixels. Therefore color slope is 10 for all color components. Next for each interpolated pixel each color component is modified by color slope.

The present method introduces a new concept in color interpolation that is based on interleaving of color components updates. It will be obvious to one skilled in the art that the method may be implemented in software, hardware or a combination of both.

In order to reduce the number of mathematical operations required, the method divides color channels, of a given color scheme, into at least two groups and updates each group's color components every K pixels instead of every single pixel, where K is the number of color components groups. This allows to process i.e. interpolate more than a single pixel in one loop iteration. For example the first group of color components is updated every odd pixel and the second group of color components is updated every even pixel. This guarantees, that moving one pixel to the right will always cause some change in a final color. This may be defined in a pseudocode as:

```
Rf2 = 2 * Rf, Gf2 = 2 * Gf, Bf2 = 2 * Bf;
for (...) {
    putpixel(i, R,G,B);
    R = R + Rf2;
    B = B + Bf2;
    putpixel(i+1, R,G,B);
    G = G + Bf2;
}
```

The values of Rf, Gf and Bf are commonly referred to in the art as a color slope. The multiplier by two is a color slope multiplier, which is to compensate for the fact that the additions are two times less frequent in this particular exemplary embodiment. The color slope will typically be calculated as linear and equals the difference in the color component value divided by the number of pixels. Nevertheless non-linear calculations are permitted wherein color slope may vary depending on location of the pixel.

Amortized cost, to execute the interpolation according to the present method, decreases from 3 additions per pixel to 1.5 addition. For the human eye, the pictures generated by the present method look almost identical to that, which are generated using the common method of calculating each and every color channel for each pixel, which in the RGB color scheme requires 3 additions per pixel.

Depending on system requirements and quality constraints the method may also be applied in other color systems. Different results will be obtained because some color systems are more sensitive to changes of specific color components. For example, changing luminance in HSL color system every two pixels will be more visible than changing one of HS color channels.

It has been found, during experiments, that the human eye is more sensible to changes in brightness than to changes in color. The method presented herein makes use of this fact to gain additional performance. Changes in color, caused by the new algorithm, are almost unnoticeable to the viewer in comparison to the typical computation of interpolated colors.

Therefore in order to gain performance one can modify the typical case of interpolating each of the color components between the color component values in the first color and the color component values in the second color. It has been found that a color of a pixel could be interpolated basing on an origin color by copying at least one color component from the corresponding color component of the neighboring pixel and calculating at least one other color component. In one embodiment, of the present technical concept, the neighboring color of a pixel can be for example the previous or a preceding pixel's color.

Figure 2:
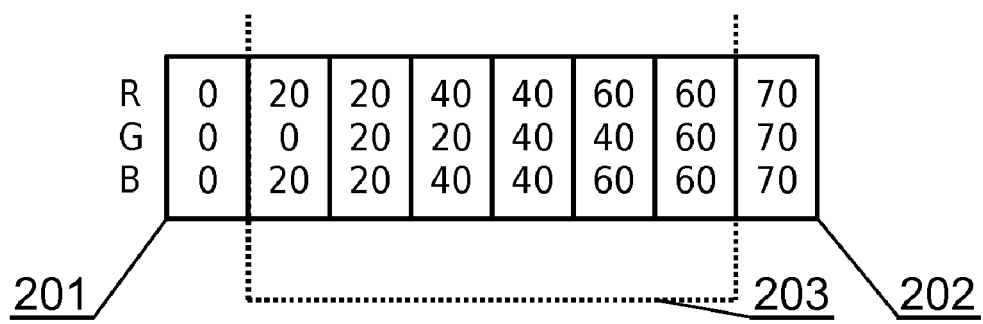
FIG. 2 shows an example of color interpolation according to the present method.

FIG. 2 shows an example of color interpolation according to the present method. In this example RGB colors have been used. The first color components 201 all equal 0. The second color components 202 all equal 70. Nevertheless it is to be understood that all values may be used and color components need not be equal. The colors to be interpolated are in the range 203. Color slope in this case equals (70−0)/(7−0) wherein 70 and 0 are color components and 7 and 0 are for example X coordinates of first and second given pixels. Therefore color slope, calculated for each and every color component, is 10 in this example for all color components. Next for each interpolated pixel each color component is modified by the color slope multiplied by a color slope multiplier, which in this case is equal to two since color components RGB have been divided into two groups where the first color components group comprises the R and the B color components and the second color components group comprises only the G color component. As can be seen, in the presented example, every second color remains as in the typical method, while remaining colors are insignificantly different from those in the typical method. However this change results in significant overall performance increase.

Figure 3:
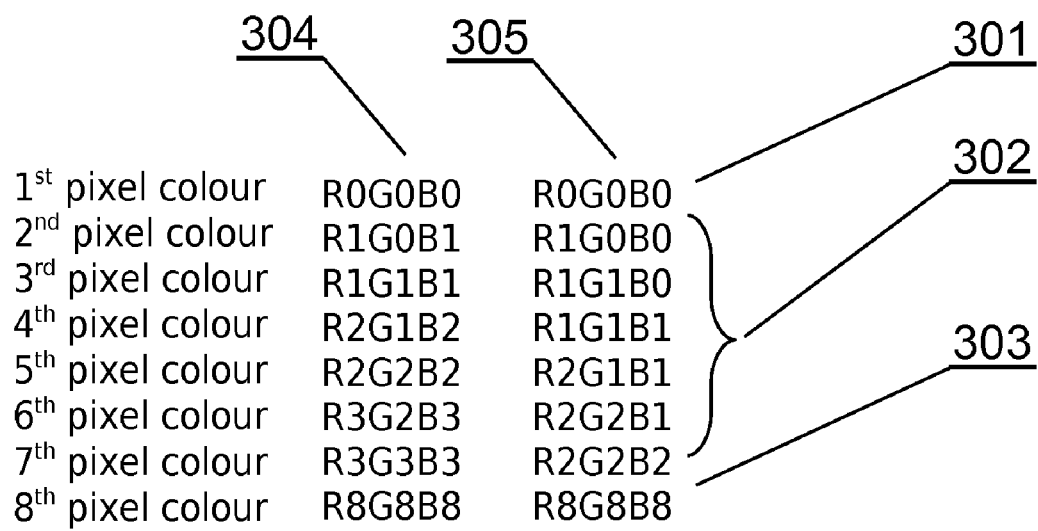
FIG. 3 shows an example of interleaving of color components updates.

FIG. 3 depicts an example of interleaving of color components updates according to the present method. In this example there are eight pixels 301, 302, 303 wherein pixels 301 and 303 are start and end of a line and pixels 302 are to be interpolated. Pixel 301 has an assigned color value of R0G0B0 and pixel 303 has an assigned color value of R8G8B8. There are two cases presented, wherein the first case 304 presents an example where one group of color components comprises the Red and Blue color components and the second group of color components comprises only the Green color component. The second case 305 presents an example where the first group of color components comprises only the Red color component, the second group of color components comprises only the Green color component and the third group of color components comprises only the Blue color component. The present method as shown in examples in FIG. 3 is based on defining color of each interpolated pixel 302 between the first pixel 301 color and the second pixel 303 color, by copying at least one color component from the corresponding color component of the previous pixel and calculating at least one other color component. For example in case of the $2^{nd}$ pixel color of the case 304 it means that color components of one group, in this case G0, will be copied from the corresponding previous pixel's color components, which in this case is the pixel 301. The other color components will be calculated and in this example those color components are R1 and B1. Similarly all following pixels are interpolated according to this principle. The color slope multiplier is two in case of the 304 example and three in the second example 305 accordingly.

Figure 4:
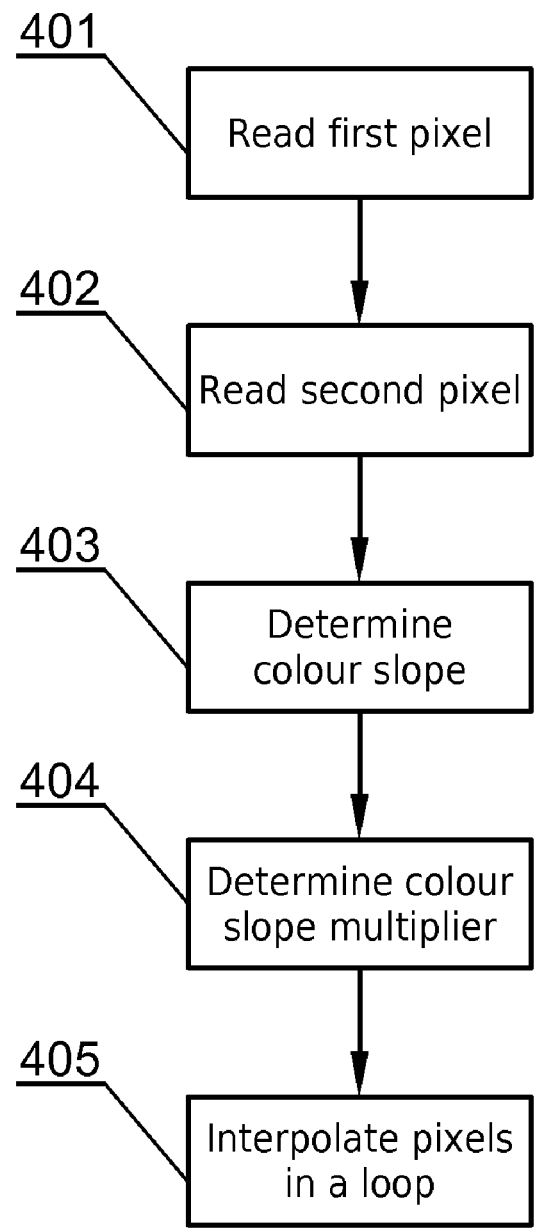
FIG. 4 shows a block diagram illustrating steps of interpolation method.

FIG. 4 is a block diagram illustrating steps of the present interpolation method. The first step of the procedure 401 is to read the first defined pixel wherein the first pixel has an assigned color attribute in a given color scheme, for example RGB. The second step of the procedure 402 is to read the second defined pixel wherein the second pixel has an assigned color attribute in a given color scheme, for example RGB. These pixel's colors define start and end points of the color interpolation. Next, at step 403, a color slope is calculated, which may be defined according to any mathematical formulae. Subsequently, in step 404 of the procedure, a color slope multiplier is set, which depends on the number of groups of color components, into which available color components will be divided, this of course depends on a color scheme. Examples of division have been shown with reference to FIG. 3. The last step of the method is to do the actual interpolation for all colors of pixels in a loop 405. The interpolated colors of pixels will typically be stored in a memory and displayed when required.

Performance tests have shown that the method, according to the present technical concept, results in improved performance by about 25% as presented in the example in FIG. 2.

It can be easily recognised, by one skilled in the art, that the aforementioned method may be performed by one or more computer programs. Such computer programs are typically executed by utilizing the computing resources in a computing device such as personal digital assistants, cellular telephones, receivers and decoders of digital television or the like. Applications are stored in non-volatile memory, for example flash memory or volatile memory, for example RAM and are executed by a processor. These memories are exemplary recording media for storing computer programs comprising computer-executable instructions performing all the steps of the computer-implemented method according to the technical concept presented herein.

While the technical concept presented herein has been depicted, described, and has been defined with reference to particular preferred embodiments, such references and examples of implementation in the foregoing specification do not imply any limitation on the concept. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A method for color interpolation between colors of two pixels, the method comprising the steps of:
   defining a first pixel color, the first pixel color having at least two color components;
   defining a second pixel color, the second pixel color having the same color components as the first pixel color, wherein values of color components of the second pixel color are different from values of color components of the first pixel color;
   for each color component, defining a color slope calculated as a function of the corresponding first pixel color component, the second pixel color component and a number of pixels colors to be interpolated;
   defining a plurality of interpolated pixels colors, having the same color components as the first pixel color and the second pixel color, between the first pixel color and the second pixel color, wherein the color components of each interpolated pixel color are determined by
      copying a value of at least one color component from a corresponding color component of a preceding pixel; and
      calculating a value of at least one other color component as a function of the color slope for the particular color component such that all color components are either copied or calculated.

2. The method according to claim 1 wherein the color components are Red, Green and Blue.

3. The method according to claim 1 wherein the color slope is calculated as a difference between the corresponding first pixel color and the second pixel color divided by the number of pixels colors to be interpolated and a calculating step includes modifying a corresponding color component of the preceding pixel by the color slope multiplied by a color slope multiplier, the color slope multiplier being inversely proportional to frequency with which the color component is calculated for consecutive interpolated pixels colors.

4. The method according to claim 1 wherein the plurality of interpolated pixel colors are defined by a series of steps, comprising repeated steps of:
   for one interpolated pixel color, copying color values from a preceding pixel for a first group of color components and calculating color values for a second group of color components; and
   for a consecutive interpolated pixel color, copying color values from a preceding pixel for the second group of color components and calculating color values for the first group of color components.

5. The method according to claim 1 wherein a first group of color components comprises a single color component or a second group of color components comprises a single color component.

6. A non-volatile computer readable memory having computer-executable instructions performing all the steps of the computer-implemented method according to claim 1.

\* \* \* \* \*